United States Patent
Smith (10) Patent No.: US 12,019,020 B2
(45) Date of Patent: Jun. 25, 2024

(54) LASER METHOD AND APPARATUS FOR ANALYSING CRYSTALS

(71) Applicant: Oxford University Innovation Limited, Oxford (GB)

(72) Inventor: Jason Smith, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 473 days.

(21) Appl. No.: 17/284,209

(22) PCT Filed: Oct. 7, 2019

(86) PCT No.: PCT/GB2019/052820
§ 371 (c)(1),
(2) Date: Apr. 9, 2021

(87) PCT Pub. No.: WO2020/074864
PCT Pub. Date: Apr. 16, 2020

(65) Prior Publication Data
US 2021/0341387 A1    Nov. 4, 2021

(30) Foreign Application Priority Data
Oct. 11, 2018  (GB) ..................................... 1816589

(51) Int. Cl.
*G01N 21/88*    (2006.01)
*G01N 21/64*    (2006.01)
*G01N 21/84*    (2006.01)

(52) U.S. Cl.
CPC ......... *G01N 21/6402* (2013.01); *G01N 21/88* (2013.01); *G01N 2021/8477* (2013.01); *G01N 2201/06113* (2013.01)

(58) Field of Classification Search
CPC .... G01N 21/64; G01N 21/88; G01N 21/6402; G01N 21/87; G01N 2021/8477; G01N 2201/06113; C30B 31/20
See application file for complete search history.

(56) References Cited

U.S. PATENT DOCUMENTS 4,880,613 A    11/1989  Satoh
4,964,133 A    10/1990  Pollock
(Continued)

FOREIGN PATENT DOCUMENTS

CA    3034857 A1    3/2018
CN    107305185 A    10/2017
(Continued)

OTHER PUBLICATIONS

PCT International Search Report and Written Opinion, PCT Application No. PCT/GB2019/052820, mailed Dec. 13, 2019, 13 pages.
(Continued)

*Primary Examiner* — Jurie Yun
(74) *Attorney, Agent, or Firm* — McDonnell Boehnen Hulbert & Berghoff LLP (57) ABSTRACT

A method of analysing crystals is described. The method comprises focusing a laser into a crystal to induce the creation, modification, dissociation, or diffusion of one or more defects within a focal region of the laser. A signal dependent on the creation, modification, dissociation or diffusion of the one or more defects within the focal region of the laser is measured during or after the aforementioned process and used to determine one or more characteristics of the crystal being analysed. In one configuration, one or more fluorescent defects are created, modified, or dissociated and the fluorescent signal is analysed to determine the type of crystal being analysed.

23 Claims, 7 Drawing Sheets

---

Focusing a laser into a crystal to induce creation, modification, dissociation, or diffusion of one or more defects within a focal region of the laser.

↓

Monitoring a signal dependent on the creation, modification, dissociation or diffusion of the one or more defects within the focal region of the laser during or after application of the laser, the signal being dependent on the crystal structure in which the one or more defects are disposed.

↓

Determining one or more characteristics of the crystal being analysed based on said signal.

(56) References Cited

U.S. PATENT DOCUMENTS

| | | | |
|---|---|---|---|
| 9,546,961 | B1 | 1/2017 | Pan |
| 11,414,783 | B2 * | 8/2022 | Smith .................... C30B 33/00 |
| 2009/0159816 | A1 | 6/2009 | Von Der Goenna et al. |
| 2011/0315988 | A1 | 12/2011 | Yu |
| 2017/0010217 | A1 | 1/2017 | Paleari |
| 2018/0067056 | A1 | 3/2018 | Simic |
| 2018/0187333 | A1 | 7/2018 | Booth |
| 2019/0145919 | A1 | 5/2019 | Clevenson |

FOREIGN PATENT DOCUMENTS

| | | |
|---|---|---|
| EP | 0275063 A2 | 7/1988 |
| EP | 1630549 A1 | 3/2006 |
| EP | 1305608 B1 | 2/2007 |
| EP | 2221810 A2 | 8/2010 |
| RU | 2465377 C1 | 10/2012 |
| WO | 99/57544 A1 | 11/1999 |
| WO | 2011/120089 A1 | 10/2011 |
| WO | 2013/188651 A1 | 12/2013 |
| WO | 2017006092 A1 | 1/2017 |

OTHER PUBLICATIONS

UKIPO Search Report under Section 17, GB Application No. 1816589.4, dated Apr. 11, 2019, 1 pg.

Liu, Yan, Gengxu Chen, Min Song, Xueting Ci, Botao Wu, E. Wu, and Heping Zeng. "Fabrication of nitrogen vacancy color centers by femtosecond pulse laser illumination." Optics express 21, No. 10 (2013): 12843-12848.

Chen Y., Salter, P., Knauer S. et al., Laser Writing of Coherent Colour Centres in Diamond, Nature Photonics, 11, 77-80 (2017), https://doi.org/10.1038/NPHOTON.2016.234, UK.

International Search Report and Written Opinion of the International Searching Authority, PCT Application No. PCT/GB2019/051358, mailed Jul. 15, 2019, 16 pages.

UKIPO Combined Search and Examination Report under Sections 17 and 18(3), GB Application 1808367.5, mailed Dec. 4, 2018, 8 pages.

* cited by examiner

LASER METHOD AND APPARATUS FOR ANALYSING CRYSTALS

CROSS REFERENCE TO RELATED APPLICATIONS

The present application is a national stage entry of, and claims priority to, PCT/GB2019/052820, filed on Oct. 7, 2019, which claims priority to European Patent Application GB 1816589.4, filed in the UK Patent Office on Oct. 11, 2018, both of which are hereby incorporated in their entirety herein by reference.

FIELD OF INVENTION

The present specification relates to a laser method and apparatus for analysing crystals.

BACKGROUND OF INVENTION

Analysis of crystals is useful in a number of different contexts. The presence of defects and impurities in crystals affects their appearance, their optical, electronic and magnetic properties, and their thermal and mechanical properties. Small concentrations of impurities and other defects can therefore significantly affect the functionality of crystals for technological or industrial purposes or their market value as gemstones. In some cases the presence of impurities and other defects may reveal important information regarding the origin or history of a crystal, for example the method of its production, the geographical location of its excavation or a processing treatment to which it has been exposed. Methods for analysing crystals that do not themselves reduce value or deteriorate functionality are therefore of considerable importance.

Numerous different methods exist for analysing defects and impurities in crystals. For example, X-ray topographic techniques can be used to provide information about the type, concentration, distribution, and orientation of extended defects, such as dislocations, extending through the crystal lattice. Spectroscopic methods such as optical absorption or fluorescence and magnetic resonance are commonly used to provide information about the type, concentration, distribution, and orientation of impurities and/or point defects within the crystal lattice structure. In some cases these methods do not provide enough information for a full analysis however, either through being insufficiently sensitive to low concentrations of the defects or impurities in question, or because the type of impurities or defects present are not measurable using the available techniques.

Point defects which absorb and emit light at particular wavelengths characteristic of the nature of the defects are known as colour centres. Colour centres form in a range of crystal types and have a range of structures which include single impurity atoms, lattice vacancies, and combinations thereof. For example, vacancy defects may combine into pairs or clusters or combine with impurity atoms to form unique vacancy structures with their own individual properties. For example in a diamond crystal where the pure crystal consists of a regular lattice containing only carbon atoms, many different colour centre defect complexes can occur. Examples include silicon-containing defects such as silicon-vacancy defects (Si—V), silicon di-vacancy defects (Si—V2), silicon-vacancy-hydrogen defects (Si—V:H), silicon di-vacancy hydrogen defects (S—V2:H) and nitrogen containing defects such as nitrogen-vacancy defects (N—V), di-nitrogen vacancy defects (N—V—N), and nitrogen-vacancy-hydrogen defects (N—V—H). These defects are typically found in a neutral charge state or in a charged state, e.g. negatively charged. The presence or creation of colour centres therefore reveals information regarding the types and concentrations of impurities in the crystal.

Colour centres occur naturally in many crystal types, being formed during crystal growth. The type, concentration, distribution and orientation of such defects within a crystal lattice is indicative of the type of crystal being analysed. For example, natural and synthetic diamond crystals have different types, concentrations, distributions and orientations of both extended and point defects. These differences can be utilized to enable natural and synthetic diamonds to be distinguished for example. Fluorescence analysis devices are particularly useful and are commercially available for crystal analysis.

One problem with current analysis techniques for distinguishing between natural and synthetic crystals is that synthesis processes can be altered and post synthesis processes applied to produce crystals with point defects which more closely match those of a natural crystal. Furthermore, while distinctive layers of point defects can be artificially grown into a crystal, this requires modification of the crystal growth process. A further problem is that although x-ray techniques can be used to identify dislocation patterns which are distinctive of synthetic crystals when compared to natural crystals, such x-ray techniques are expensive to implement and use in the market place. A need therefore exists for advanced characterisation techniques that provides more detailed information about crystal defects and impurities.

It is also known that crystals can be processed or treated to add, modify or remove colour centres within a crystal lattice. For example, irradiation, implantation, and thermal annealing techniques can be used, either alone or in combination, to produce desirable colour centres. Such colour centres can be useful for a number of optical, electronic, and quantum sensing and information processing applications.

It is an aim of the present invention to provide a laser method and apparatus for analysing crystals.

SUMMARY OF INVENTION

Laser methods have recently been developed for creating, modifying, dissociating, and diffusing of defects within crystals. Such methods comprise: focusing a laser into a crystal to induce the creation, modification, dissociation, or diffusion of defects within a focal region of the laser; detecting, via fluorescence, when a colour centre is formed within the focal region; and terminating the laser when a desired number or type of colour centres have been formed. Such methods can be used for the deterministic writing of individual colour centres into crystals at selected locations with high positional accuracy using laser processing with online fluorescence feedback. The methods provide a tool for the fabrication of engineered materials and devices such as for quantum technologies. Furthermore, creating colour centres using solely laser-induced processes has been found to provide an improved positional accuracy of colour centres when compared with methods which utilize bulk thermal annealing of the crystal to fabricate the colour centres.

It has now been realised that a modified laser method can be used to analyse crystals to determine one or more characteristics of the crystal. Such a method, may be used, for example, to determine the type of crystal without unduly modifying or damaging the crystal. In this regard, due to differences in the underlying crystal lattice (such as differences in strain, chemical impurities, magnetic spin environment, and/or isotopic content, which may be indicative of the crystal formation process or natural source of the crystal material), crystal defects can have distinctive and different properties and/or form, modify, diffuse and/or dissociate in a distinctive manner. That is, the dynamics of formation and destruction of crystal defects by a laser method, and the properties of those defects, are indicative of the crystal lattice and can effectively function to probe the surrounding crystal lattice giving information about the crystal lattice.

In this regard, a method of analysing a crystal is described herein, the method comprising:

focusing a laser into a crystal to induce creation, modification, dissociation, or diffusion of one or more defects within a focal region of the laser;

monitoring a signal dependent on the creation, modification, dissociation, or diffusion of the one or more defects within the focal region of the laser during or after application of the laser, the signal being dependent on the crystal structure in which the one or more defects are disposed; and determining one or more characteristics of the crystal being analysed based on said signal.

The method enables a crystal to be analysed at one or more distinct locations within the crystal. Furthermore, since the laser can be focussed to a very small volume of crystal, and controlled to have a relatively low energy, undue damage to the crystal can be avoided. By achieving a high degree of control in terms of defect manipulation, the defects can be used to probe the surrounding crystal environment as the signal from the defects being manipulated by the laser will be dependent on characteristics such as strain, chemical impurities, nuclear spin resonance, electron spin resonance, and/or isotopic content. While previous laser methods have being utilized to probe the electronic and spin structure of existing defects in crystals, the present method differs in that the laser is used to create, modify, dissociate, or diffuse defects rather than probe existing defects without modifying the defects. Furthermore, the present method can be used to convert defects which are not optically active into optically active colour centres and thus give additional information which is not provided by techniques which only assess existing optically active defects in a crystal structure. That is, non-fluorescent defects can be converted into fluorescent defects (e.g. by combining with vacancies via laser processing) effectively turning on defects within the crystal for optical analysis.

The method may be used on its own or in conjunction with one or more known crystal analysis methods to determine information about the crystal including one or more of crystal type, origin, and quality.

The one or more defects may include one or more fluorescent defects and the signal can be a fluorescent signal from the one or more fluorescent defects. A variation of the signal over time and/or wavelength can be monitored, e.g. during application of the laser, to determine one or more characteristics of the crystal being analysed based on said signal. For example, the determining step may comprise a spectroscopic analysis of the signal (e.g. Raman spectroscopy). In this regard, it has been found that the fluorescent signal emitted during formation of a colour centre using the laser processing technique can have a relatively complex fingerprint which can be indicative of the type of crystal in which the defects are being manipulated by the laser. Further information can be discerned by varying one or more parameters of the laser during monitoring. For example, the wavelength, pulse length, pulse energy, and/or pulse frequency of the laser can be varied and the signal monitored to discern different information about the surrounding crystal lattice. Furthermore, the focusing, monitoring, and determining steps can be repeated at multiple points in the crystal and data from each of the points can then be used to determine one or more characteristics of the crystal being analysed. This may include a statistical analysis of the data across a plurality of analysis points.

Creating colour centres using solely laser-induced processes has been found to provide an improved positional accuracy of colour centres when compared with methods which utilize bulk thermal annealing of the crystal to fabricate the colour centres. While not being bound by theory, it is believed that the laser facilitates physical processes such as the diffusion of vacancies only in a small volume near the highest intensity of the laser focus such that colour centres are formed only in this region.

Colour centres may be formed by several physical mechanisms including the diffusion of a vacancy to bind to another existing defect, the laser-induced modification of an existing defect such as by the dissociation of a vacancy, or the generation of a Frenkel defect immediately adjacent to a substitutional impurity. Equally a colour centre may be destroyed by the action of the laser, for example by the dissociation of a vacancy from the remainder of the defect, or by the capture of another vacancy or interstitial defect in the lattice.

Further still, by detecting, via fluorescence, when a colour centre is formed within the focal region the laser can be terminated such that a controlled number of colour centres can be formed. For example, fluorescence can be monitored at least within a wavelength range of 650 nm to 750 nm which is suitable for detecting $NV^-$ colour centres in diamond. The latter can be used as a probe of the local crystal environment for additional defects, impurities or nuclear spin isotopes using established techniques.

Physical processes such as vacancy generation, vacancy diffusion, diffusion of interstitial defects, or dissociation of defect complexes correspond to the 'hopping' of one or more atoms in the crystal between positions in the lattice, those positons corresponding to local minima in the potential energy of the system with some potential energy barrier between them. Different hopping processes have different potential energy barrier heights and so require different energies to be supplied to allow the processes to occur. The activation of these processes by the laser is therefore sensitive to such parameters as laser wavelength, pulse energy and pulse duration. It may therefore be advantageous to apply the laser treatment in two or more stages using different laser wavelengths, pulse energies or pulse durations to achieve different steps in the creation and modification of colour centres. For example, the method may comprise:

focusing a first laser beam into the crystal to generate vacancy defects in the focal region of the first laser beam within the crystal, the first laser beam having a first energy; and focusing a second laser beam onto the focal region to induce diffusion of the vacancy defects within the focal region, the second laser beam having a second energy which is lower than the first energy but which is sufficient to induce diffusion of vacancy defects within the focal region, wherein the signal is monitored during application of the second laser beam to determine one or more characteristics of the crystal being analysed based on said signal.

In such a method, the first laser beam can provide a laser pulse of energy sufficient to generate vacancies within the crystal. Furthermore, the second laser beam can provide a stream of laser pulses of energy sufficiently high to induce vacancy diffusion but sufficiently low as to not form new vacancy defects. The second laser beam can provide sub-picosecond laser pulses which have been found to be suitable to cause vacancy migration in a diamond crystal for example. Furthermore, the nonlinear response of the material in respect of vacancy generation and vacancy diffusion relative to the laser pulse energy is such that, a narrow window of pulse energies exists in which colour centres are generated but continued processing does not ultimately lead to runaway lattice damage indicative of further vacancy generation.

The laser (including the aforementioned first and/or second laser beam) may be configured to provide a beam with a cross-sectional beam profile having a full-width-half maximum of no more than 10 micrometres, 1 micrometre, 500 nm, 400 nm, 350 nm, 200 nm, 250 nm, or 100 nm. Using a narrow beam enables analysis without unduly modifying the crystal over a larger volume. The actually area of crystal lattice which is modified by the laser will be less than the area of the laser due to the non-linearity of the process.

After detecting, via fluorescence, when a colour centre, or combination of colour centres, is formed within the focal region, the method may comprise determining from the fluorescence whether the colour centre or combination of colour centres has a particular property or combination of properties. Furthermore, after detecting, via fluorescence, when a colour centre, or combination of colour centres, is formed within the focal region, laser processing can be continued and the fluorescent signal is monitored to determine one or more characteristics of the crystal being analysed based on said signal. For example, after formation of the colour centre or combination of colour centres, laser processing can be controlled to dissociate the colour centre or combination of colour centres before continuing laser processing until another colour centre or combination or colour centres is formed, the changing fluorescent signal being used to determine characteristics of the crystal being analysed based on said signal.

The laser can be operated at a sufficiently high energy for the creation, modification, dissociation or diffusion of the one or more defects within the focal region of the laser during application of the laser and sufficiently low energy that the crystal is not graphitized and/or no visible damage is caused to the crystal. Furthermore, the one or more defects within the focal region of the laser can be located at a depth below a surface of the crystal between 10 nm and 250 micrometres, 50 nm and 250 micrometres, more preferably between 3 micrometres and 60 micrometres. In this way, a small sub-surface volume of crystal can be analysed without unduly damaging the crystal.

The method can be utilize to determine the type or origin of the crystal. Levels of strain, chemical impurities, nuclear spin resonance, electron spin resonance, and/or isotopic content can be probed to give information about the type or original of the crystal. In one example, the crystal is a diamond crystal and the signal is monitored to determine whether the diamond crystal is a natural diamond or a synthetic diamond. Alternatively, the method can be utilized in a quality control method to determine that the crystal meets one or more end application requirements. For example, certain applications may place limitations on levels of strain, chemical impurities, nuclear spin properties, electron spin properties, and/or isotopic content. Furthermore, for certain applications the requirements may be particular to a particular region of the crystal, e.g. where an optical path or photonic structure is to be located. In such cases, the present analysis method is advantageous in enabling a very precise region of the crystal to be probed. The present method can also be combined with other known methods such as using microwaves to interrogate nuclear and/or electron spin resonance.

According to another aspect of the present invention, there is provided an apparatus for analysing a crystal, the apparatus comprising a laser system, a detector, and a processor configured to perform the method as previously described. The detector may include a fluorescent detector. The apparatus may further comprise an electronic controller coupled to the laser system and the fluorescence detector, the electronic controller configured to control the laser system according to a fluorescence signal detected by the fluorescence detector.

One advantage of the present invention is the ability to control precisely the number and position of colour centres which are formed in the crystal lattice. This is not possible using a bulk thermal annealing method as the formation of colour centres is stochastic and thus colour centres will form at different rates in different parts of the crystal. If a thermal anneal is applied until at least one colour centre is formed at each and every location of a desired pattern within a crystal then many of the locations will have multiple colour centres by the time that a colour centre is formed at the last location in the pattern. That is, a pattern of colour centres will be produced but with a varying number of colour centres at each location of the pattern. The present invention thus not only provides an increased accuracy in terms of positioning of colour centres but also enables control of the number of colour centres at each location such that, for example, every point of the pattern has the same number of colour centres. Further still, the present method avoids the need for a bulk thermal anneal which increases cost and also can cause undue modification to the crystal.

BRIEF DESCRIPTION OF THE DRAWINGS

Embodiments of the present invention are described by way of example only with reference to the accompanying drawings in which.

DETAILED DESCRIPTION

Figure 1A:
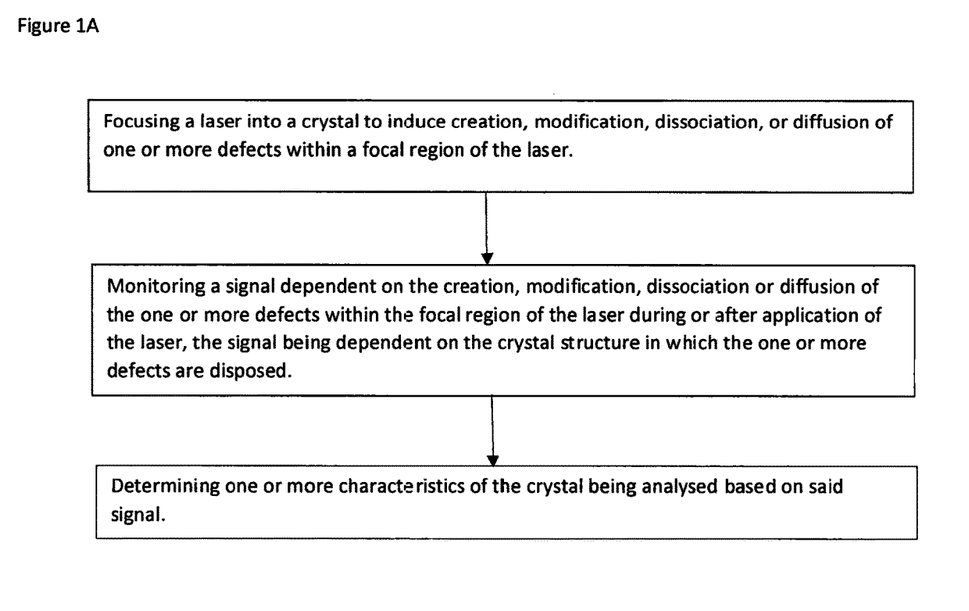
FIGS. 1A and 1B show flow diagrams of method steps for analysing a crystal.
Figure 1B:
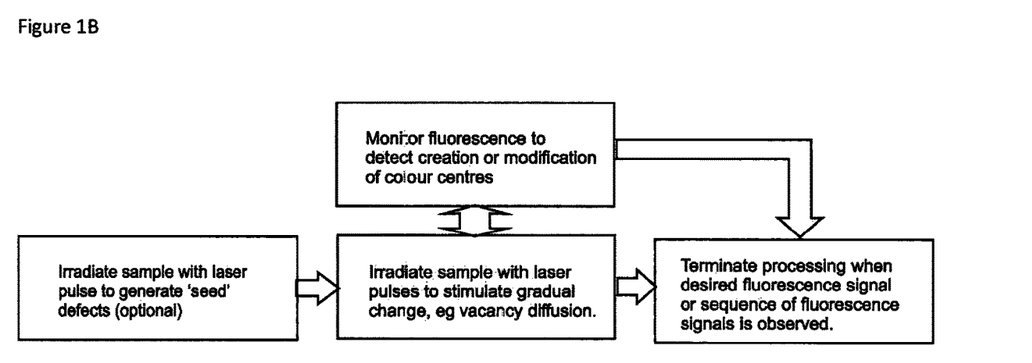

FIGS. 1A and 1B show flow diagrams illustrating examples of the method steps for analysing a crystal lattice. A sample is irradiated with a laser pulse to generate "seed" defects. The sample is then irradiated with laser pulses to stimulate gradual change (e.g. via diffusion of a vacancy defect within the focal region, by the laser-induced modification of an existing defect such as by the dissociation of a vacancy, or the generation of a Frenkel defect immediately adjacent to a substitutional impurity). A signal is monitored which is dependent on the creation, modification, dissociation, or diffusion of the one or more defects within the focal region of the laser during application of the laser, the signal being dependent on the crystal structure in which the one or more defects are disposed. For example, fluorescence can be monitored to detect creation, modification, or dissociation of colour centres. The signal is analysed to determine the type of crystal being analysed based on said signal. Finally, processing is terminated when a desired fluorescence signal or sequence of fluorescence signals is observed.

The laser treatment can be applied in two stages, e.g. a seeding laser pulse followed by a colour-centre-generating laser pulse train. However, it is also envisaged that the method can be utilized without the seeding pulse if, for example, vacancies are present already as a result of the crystal growth process, as a result of an alternate method for vacancy generation, e.g. electron beam irradiation, or by using laser pulses that provide for both vacancy generation and diffusion.

Figure 2:
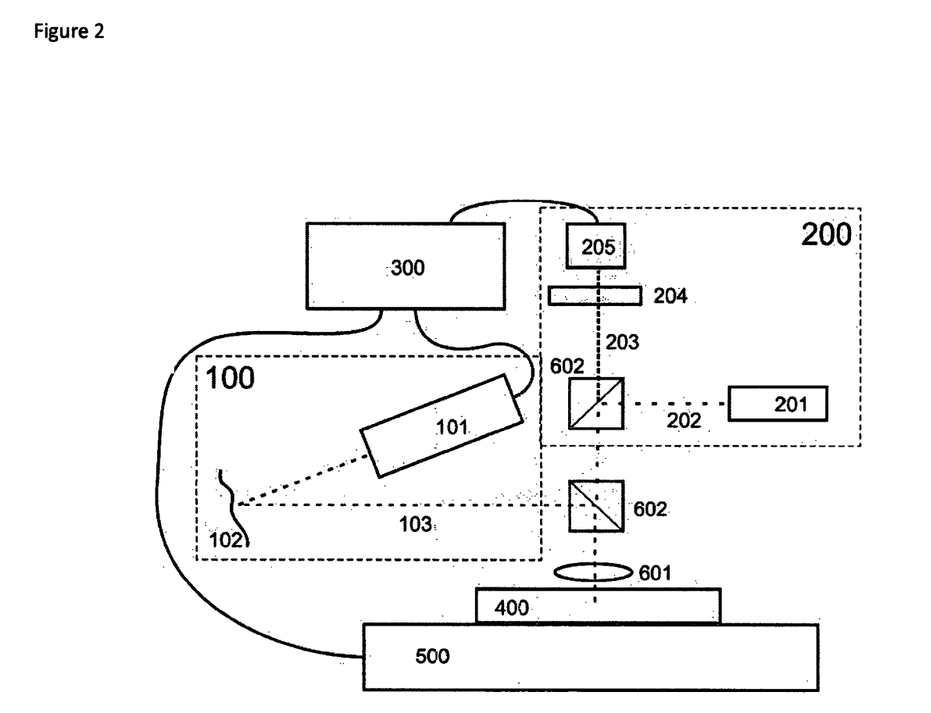
FIG. 2 shows a schematic diagram of an apparatus for implementing the method of FIG. 1.

An example of an optical layout for the combined laser processing and fluorescence feedback apparatus is shown in FIG. 2. The apparatus comprises a laser writing system 100 including a writing laser 101 and aberration correction optics 102 for generating a writing laser beam 103. Note that for certain configurations and applications the aberration correction optics may not be required. The apparatus further comprises a fluorescence detection system 200 including a fluorescence excitation laser 201 for generating a fluorescence excitation laser beam 202 resulting in a fluorescence beam 203. The fluorescence detection system 200 further comprises optical filters 204 and a fluorescence detector 205. The system further comprises optical beam splitters 602 and a focusing lens 601. The sample 400 for processing is provided on a sample positioning stage 500. An electronic control system 300 is coupled to the laser writing system 100, the fluorescence detection system 200, and to the sample positioning stage 500. The electronic control system 300 can be configured to control the laser system 100 according to a fluorescence signal detected by the fluorescence detector 200. However, it is also envisaged that the apparatus could be manually operated rather than automated in this fashion. A crystal sample 400 is provided on a sample stage 500. The laser system is configured to focus a laser beam into the crystal sample 400. The fluorescence detector is configured to detect fluorescence from a colour centre formed in the focal region of the laser beam within the crystal sample 400.

In this illustrative example, the laser processing was performed using a regeneratively amplified Ti:Sapphire laser (Spectra Physics Solstice) at a wavelength of 790 nm and a 1 kHz pulse repetition rate. The laser beam was expanded onto a liquid crystal phase-only spatial light modulator (SLM) (Hamamatsu X10468-02), which was imaged in a 4f configuration onto the back aperture of a 60× 1.4NA Olympus PlanApo oil immersion objective. A diamond sample was mounted on precision translation stages (Aerotech x-y: ABL10100; z: ANT95-3-V) providing three dimensional control. Prior to the objective, the laser pulse was linearly polarised and had a duration which was measured to be 250 fs using an intensity autocorrelator (APE Pulsecheck). The pulse duration at focus is slightly increased due to dispersion in the objective lens. To optimise the aberration correction, the phase pattern displayed on the SLM was adjusted to minimise the pulse energy needed to produce visible fluorescence at test processing positions of similar depth in the sample.

Fluorescence feedback was achieved using a scanning confocal microscope, with excitation from a frequency-doubled diode-pumped YAG laser at 532 nm and detection using a silicon single photon avalanche diode (Excelitas). Excitation power of 2 mW was reflected towards the sample at a 570 nm dichroic beamsplitter, and fluorescence transmitted through the dichroic was additionally filtered using a 650-750 nm band pass filter.

Effective correction for aberrations of the processing laser beam allows the point spread function near the focus to be approximated to that of a focused Gaussian beam $$I(r, z) = I_0 \cdot \frac{1}{1 + \left(\frac{z}{z_R}\right)^2} \cdot e^{-\frac{2r^2}{w_z^2}}$$

where $$w_z = w_0 \sqrt{1 + \left(\frac{z}{z_R}\right)^2}$$

is the beam width at axial displacement z, $w_0$ is the beam waist and $z_R$ is the Rayleigh range. The laser processing volume is determined from the point spread function of the processing laser and the nonlinearity of the process involved. For a process that is activated according to the y$^{th}$ power of the laser intensity, the point spread function is modified to $$I_y(r, z) = I_0^y \cdot \frac{1}{\left(1 + \left(\frac{z}{z_R}\right)^2\right)^y} \cdot e^{-\frac{2yr^2}{w_z^2}}$$

such that the waist for the nonlinear process is equal to the linear beam waist multiplied by a factor $$\frac{1}{\sqrt{y}}$$

and the axial dimension for the nonlinear process is equal to the Rayleigh range multiplied by a factor $\sqrt{2^{1/y}-1}$.

The present manifestation is achieved with a numerical aperture of 1.4 achieved with an oil immersion objective lens, and with a processing laser wavelength of 790 nm, such that we estimate that $w_0=297$ nm and $z_R=852$ nm. The dimensions of the processing region will then depend on the degree of nonlinearity, y. The values of this parameter for different processes are not well known, so we provide here only some illustrative examples which appear consistent with our measured data. For a process with a nonlinearity y=9, the waist will be reduced to 99 nm, and the axial dimension is reduced to 241 nm. In another example of a process with nonlinearity y=14, the waist will be reduced to 79 nm and the axial dimension is reduced to 192 nm.

Higher numerical apertures than that of the present manifestation can be achieved using solid immersion lenses that will in principle lead to further reductions in the processing volume beyond those described above. For example the use of a diamond solid immersion lens might readily achieve a numerical aperture of 2.1 that would reduce the dimensions of the linear point spread function to $w_0=198$ nm and $z_R=374$ nm. For a y=14 nonlinear process the radial and axial dimensions would then be 53 nm and 84 nm respectively.

Photoluminescence (PL) imaging to characterise the written colour centres subsequent to laser processing was carried out using a scanning confocal microscope and spectroscopy with a 500 mm spectrograph (Acton SpectraPro 500i) fitted with a back-illuminated CCD camera (Princeton Spec-10 100B), with >90% quantum efficiency across the wavelength range of interest. Excitation was performed using a frequency-double YAG laser ($\lambda$=532 nm) with a maximum power delivery to the sample of 4 mW. A laser clean-up filter is used in excitation, combined with a 540 nm dichroic beam splitter and a 532 nm blocking notch filter in the collection optics. When recording a PL image, a 650 nm long-pass filter is inserted in the fluorescence collection path to block the diamond Raman emissions (all filters were from Semrock).

Figure 3:
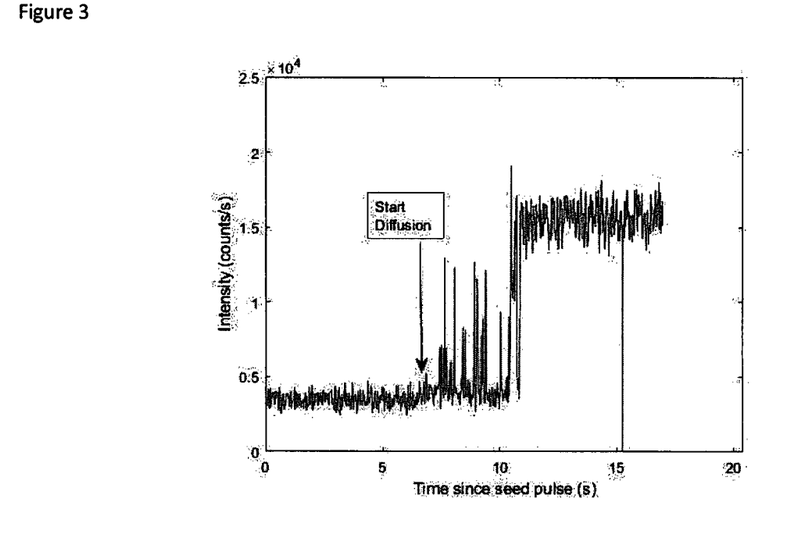
FIG. 3 shows a fluorescence intensity trace as a function of time in which the laser processing was halted upon first observation of a strong and stable fluorescence signal indicative of a single $NV^-$ colour centre.
Figure 4:
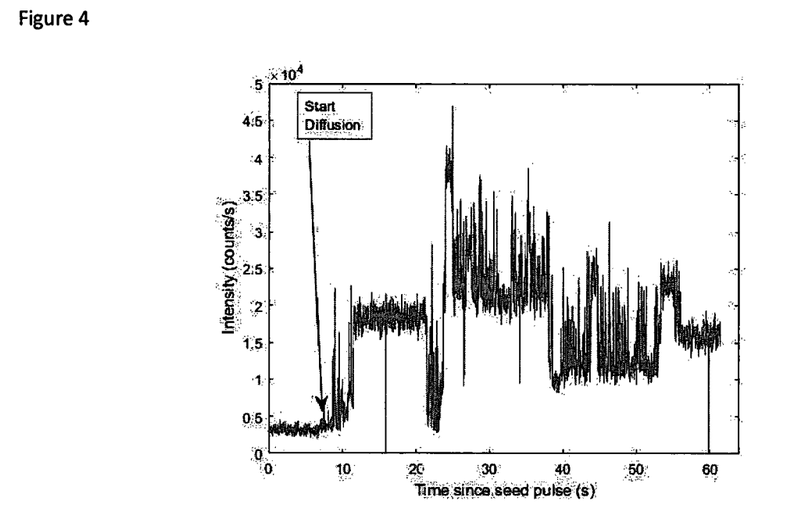
FIG. 4 shows a fluorescence intensity trace as a function of time showing multiple events attributable to the creation and removal of $NV^-$ defects during extended laser processing.

Two examples of traces from the fluorescence intensity monitor are shown in FIGS. 3 and 4 to provide insight into the dynamics of the laser processing. The zero of the horizontal time axis corresponds to the seed laser pulse and this is followed by commencement of a laser pulse stream (labelled with an arrow). The vertical axis shows the number of photon detection events per second recorded on the detector, at a sampling rate of 50 Hz. The creation of an NV centre is first indicated by intermittent fluorescence of an intensity of several thousand photon counts per second at the detector, and then after a few seconds by stable, high intensity fluorescence. The processing is terminated shortly after stable fluorescence is observed.

Continued processing of a site beyond the creation of a single NV centre reveals the occurrence of further events within the focal volume. FIG. 4 shows an example of a fluorescence trace in which the first stable fluorescence disappears after about 10 seconds of continued processing, followed by several other changes of measured fluorescence intensity between levels of short term stability over the following 40 second period. Measurements of processed sites terminated at different stages suggest that individual NV centres can be both created and destroyed, and that different numbers of NVs can be produced at a site with a degree of control.

While not being bound by theory, the physical mechanism behind the laser processing method is briefly discussed below.

The generation of vacancies in diamond by a sub-picosecond laser pulse is thought to be via multi-photon absorption that promotes electrons to high energy states, followed by rapid relaxation of the electrons by transfer of their energy to the lattice. It follows that the laser-induced vacancy diffusion processes observed here may occur by a similar process, but with a lower nonlinearity resulting from the lower energy requirement for a vacancy to hop to an adjacent lattice site than for a new vacancy to be created. Diffusion of other species with low activation energies, such as self-interstitials, is also likely. These experiments provide qualitative support for this picture with a high degree of nonlinearity observed in the rate of $NV^-$ generation with the energy of the diffusion pulses, such that only a narrow window of pulse energies exists in which $NV^-$ centres are generated but continued processing does not ultimately lead to runaway lattice damage indicative of further vacancy generation. Recently Kononenko et al. have reported the laser-induced generation of near-surface NV centres in a nano-ablation regime, and concluded that the diffusion process is driven by the photoinduced plasma. It is believe that this mechanism can be ruled out for the present process in bulk diamond (sub-surface), since no plasma fluorescence is detected by the fluorescence monitoring during processing.

We hypothesize that the intermittent fluorescence observed before stable NV creation is related to the unstable binding of the NV complex in the presence of a nearby self-interstitial. The seed pulse generates Frenkel defects comprising a vacancy and nearby interstitial which experience a mutual attraction due to the opposite strain fields that surround them in the diamond lattice. It is known that the interstitial is surrounded by a positive (compressive) strain field while the vacancy is surrounded by a negative (tensile) strain field, and that substitutional nitrogen in the lattice is also surrounded by a positive strain field. It is also known that the substitutional nitrogen will therefore attract the vacancy and repel the interstitial. We hypothesize that after a Frenkel defect has been created close to a substitutional nitrogen, subsequent laser-induced diffusion of the vacancy and interstitial may therefore result in the vacancy diffusing towards the nitrogen defect and binding to it to form an NV centre. This NV centre creation event may occur while the interstitial remains sufficiently close that its attractive force on the vacancy counteracts the NV binding energy such that the vacancy can easily be dissociated from the substitutional nitrogen under subsequent laser pulses. The NV centre remains unstable while the interstitial is nearby but after continued processing the interstitial diffuses far enough away that the vacancy binds stably to the nitrogen.

The above is one hypothesis for the mechanism by which stable NV centres are created using the claimed method. Other physical mechanisms may exist that lead to the generation and removal of colour centres from the lattice and which may in principle be made use of within the purpose of this invention. For example an existing compound defect such as $NV_2$ (a bound complex containing a nitrogen atom and two vacancies) could dissociate to form an NV colour centre and a vacancy through the action of a laser pulse. Alternatively a laser pulse could generate a vacancy directly in a site adjacent to an existing defect to form a colour centre (for example next to a substitutional nitrogen atom to form an NV centre). Equally a number of laser-induced mechanisms may exist that could remove a colour centre from the lattice. For example a vacancy may be dissociated from a colour centres (e.g. an NV centre dissociated to form a substitutional nitrogen and a lone vacancy), or a vacancy undergoing laser-induced diffusion may bind to a colour centre or a vacancy may be directly generated at an adjacent lattice site to make a larger complex (for example a NV centre to form an $NV_2$ complex). Alternatively a different mobile defect could bind to a colour centre to create a different defect (for example a carbon interstitial binding to an NV centre would annihilate the vacancy to leave a substitutional nitrogen atom).

As will be clear from FIGS. 3 and 4, the signal produced during laser processing is surprisingly complex and differs for different crystal types. As such, the technique can be used to determine the type of crystal being laser processed.

Figure 5:
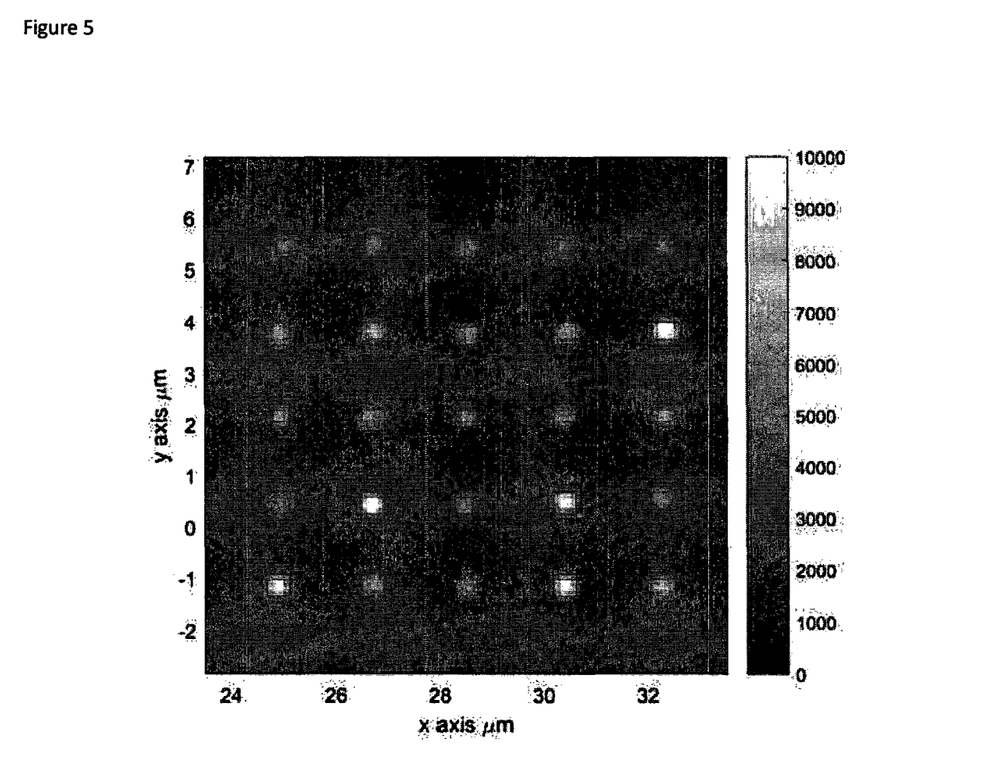
FIG. 5 shows a fluorescence image of a 5×5 array consisting entirely of single $NV^-$ colour centres written in a two-dimensional square grid with a spacing of 2 micrometres in a diamond crystal.
Figure 6:
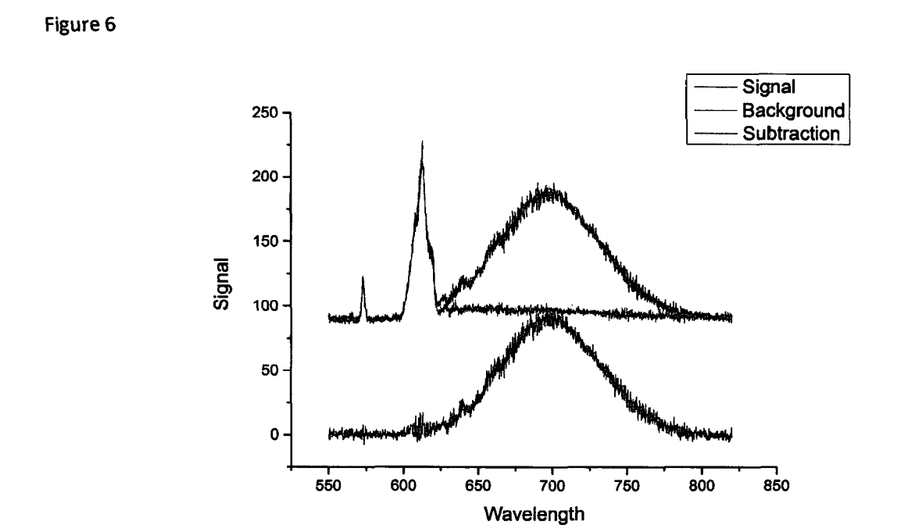
FIG. 6 shows exemplar fluorescence spectra measured from a site in FIG. 5—the upper traces show raw data measured from the processed site (signal) and adjacent to the processed site (Background)—the lower trace (Subtraction) shows the difference between the signal and background, such that the Raman signals at 573 nm and 610 nm are removed and a clean $NV^-$ fluorescence spectrum is revealed.

The laser processing as described herein is highly controlled and can produce a desired number and location of defects without causing undue damage to the surround crystal. FIGS. 5 to 9 are provided to illustrate this level of control. FIG. 5 shows a fluorescence image of an array of 25 sites written in a single crystal diamond sample. At each site in the array, an initial laser pulse of energy 23 nJ was used to generate vacancies, followed by a 1 kHz stream of pulses of energy 15 nJ to induce vacancy diffusion. Fluorescence within the wavelength range 650 nm to 750 nm was monitored until a signal indicating the creation of a negatively charged NV centre was recorded, at which point the processing was halted.

Figure 7:
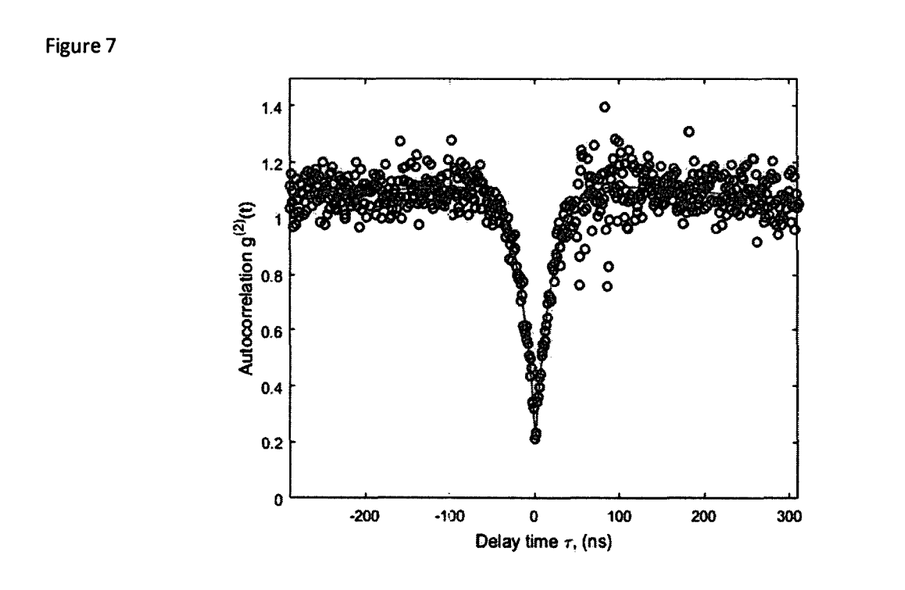
FIG. 7 shows an exemplar histogram of the photon autocorrelation function g$^{(2)}$(t) which shows a characteristic dip near to t=0 indicative of quantum light emission from a single atom-like defect.

Measurements of photon statistics and fluorescence spectra from the processed sites revealed that all 25 of the sites are single NV⁻ colour centres. The NV centres are stable in the negatively charged state with no evidence of fluorescence from the charge-neutral state NV⁰ and no discernible fluorescence from other defects such as the isolated vacancy (GR1) or extended defects (B band), as evidenced by the exemplar fluorescence spectrum displayed in FIG. 6. That the fluorescence from each site originates from a single NV— centre is evidenced by measuring the photon time-autocorrelation function $g^{(2)}(t)$ using the Hanbury Brown and Twiss method. A typical histogram is shown in FIG. 7, displaying $g^{(2)}(0)=0.2$.

Figure 8:
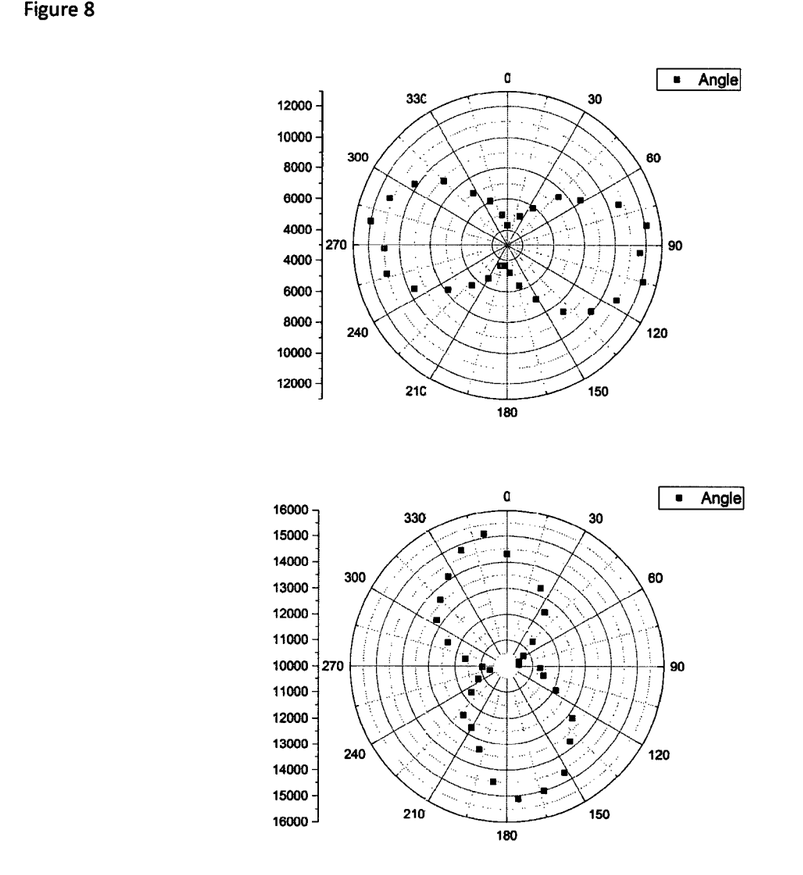
FIG. 8 shows polar plots of the fluorescence intensity as a function of linear polarisation for two of the single NV centres from FIG. 5.

The orientation of the NV⁻ centres created can be determined using the intensity and optical polarization of the fluorescence measurement, since the transition dipoles of the defect lie in the plane perpendicular to the physical axis of threefold rotational symmetry. In the sample used, the crystal plane parallel to the surface is (110) such that NVs whose axes of symmetry are oriented along the [1$\bar{1}$1] and [$\bar{1}$11] crystal axes lie in the plane and their fluorescence displays a high degree of linear polarisation. NVs oriented along [111] and [111], by contrast, make angles of 55° with the image plane, so that their measured fluorescence is more intense but only weakly polarised. Two example polar plots showing fluorescence intensity as a function of the angle of a linear polariser placed in the fluorescence detection path of the microscope are shown in FIG. 8. The upper plot shows an NV centre with its axis of symmetry lying in the plane and pointing at a relative angle of 7°, while the lower plot shows an NV centre with its axis of symmetry at an angle of 55° to the image plane and pointing at a relative angle of 76°. These plots reveal how the orientation of an NV colour centre in the lattice can be determined from the polarisation of the fluorescence compatible with online monitoring.

Figure 9:
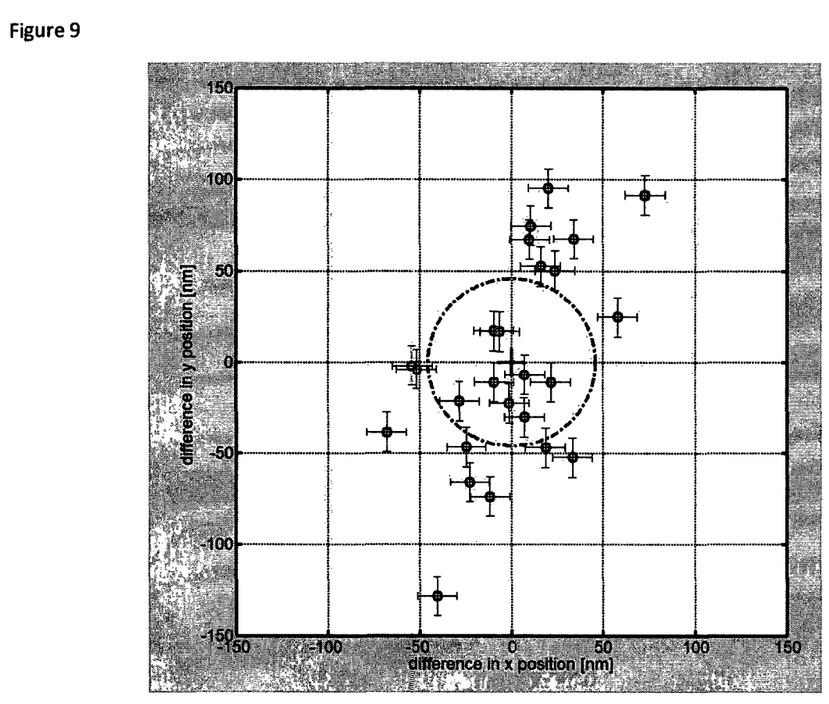
FIG. 9 shows a scatter plot of the measured positions in the image plane (perpendicular to the optical axis of the processing laser beam when focused into the crystal) of the 25 single NV$^-$ centres in FIG. 5 relative to the targeted positions—error bars on the individual points represent 95% confidence in the position measurements—the dashed circle represents the e$^{-1/2}$ bound of the maximum likelihood 2D Gaussian distribution for the dataset.

The positions of the NVs in the image plane relative to the targeted array points were measured with an accuracy of 20 nm by establishing the centroids of the points in the fluorescence image. The measured distribution is shown in FIG. 9. A maximum likelihood analysis of the distribution using the 2D Gaussian probability distribution $$P(r) = I_0 \cdot e^{-\frac{r^2}{2\sigma^2}}$$

reveals a distribution width of 2σ=90 nm, indicated in the figure by the dashed circle. This measured scatter in position relative to the targeted point is a factor of 3.3 smaller than the estimated focal width $w_0$, consistent with a nonlinearity of the field intensity raised to the $11^{th}$ power.

In summary, the present specification describes a method for localised laser processing of wide band gap materials and demonstrates the deterministic creation of single NV centres at desired locations in diamond. Feedback provided by online spectroscopic study of the processed region provides information on defect formation, orientation, and aspects of the local environment, and can be extended to measure other properties of colour centres which can probe further features of the local environment and provide additional routes to crystal identification and/or quality analysis. Accordingly, it will be appreciated that while the invention has been described in relation to certain examples, it will be appreciated that various alternative embodiments can be provided without departing from the scope of the invention which is defined by the appending claims.

The invention claimed is:

1. A method of analysing a crystal, the method comprising:
    focusing a laser into a crystal to induce creation, modification, dissociation, or diffusion of one or more defects within a focal region of the laser;
    monitoring a signal dependent on the creation, modification, dissociation or diffusion of the one or more defects within the focal region of the laser during or after application of the laser, the signal being dependent on the crystal structure in which the one or more defects are disposed; and
    determining one or more characteristics of the crystal being analysed based on the signal, wherein focusing the laser into the crystal to induce creation, modification, dissociation, or diffusion of the one or more defects within the focal region of the laser comprises:
    focusing a laser beam onto the focal region to induce diffusion of vacancy defects within the focal region, the laser beam providing a stream of laser pulses of energy sufficiently high to induce diffusion of vacancy defects within the focal region but sufficiently low as to not form new vacancy defects,
    and wherein monitoring the signal comprises monitoring the signal during application of the laser beam to determine the one or more characteristics of the crystal being analysed based on the signal.

2. The method according to claim 1, wherein the one or more defects include one or more fluorescent defects, and wherein the signal is a fluorescent signal from the one or more fluorescent defects.

3. The method according to claim 2, further comprising monitoring fluorescence at least within a wavelength range of 650 nm to 750 nm.

4. The method according to claim 2, further comprising: detecting, via fluorescence, when a colour centre, or combination of colour centres, is formed within the focal region; and determining from the fluorescence whether the colour centre or combination of colour centres has a particular property or combination of properties.

5. The method according to claim 4, further comprising: after detecting, via fluorescence, when the colour centre, or combination of colour centres, is formed within the focal region, continuing laser focusing and monitoring of the fluorescent signal to determine the one or more characteristics of the crystal being analysed based on the signal.

6. The method according to claim 5, further comprising: after formation of the colour centre or combination of colour centres, controlling laser focusing to dissociate the colour centre or combination of colour centres before continuing laser focusing until another colour centre or combination or colour centres is formed, changes in fluorescent signal being used to determine the one or more characteristics of the crystal being analysed based on the signal.

7. The method according to claim 1, further comprising: monitoring a variation of the signal over time and/or wavelength to determine the one or more characteristics of the crystal being analysed based on the signal.

8. The method according to claim 1, wherein determining the one or more characteristics of the crystal being analysed comprises performing a spectroscopic analysis of the signal.

9. The method according to claim 1, further comprising varying one or more parameters of the laser during monitoring.

10. The method according to claim 1, wherein focusing the laser into the crystal to induce creation, modification, dissociation, or diffusion of the one or more defects within the focal region of the laser further comprises focusing the laser into the crystal at each of multiple points in the crystal to induce at each of the multiple points creation, modification, dissociation, or diffusion of the one or more defects within the focal region of the laser,
wherein monitoring the signal further comprises monitoring the signal at each of the multiple points,
and wherein determining the one or more characteristics of the crystal comprises using data from each of the multiple points to determine the one or more characteristics of the crystal being analysed.

11. The method according to claim 1, further comprising controlling the laser to form an atom-vacancy defect by one of:
diffusion of a vacancy defect within the focal region;
laser-induced modification of an existing defect by dissociation of a vacancy; or
generation of a Frenkel defect immediately adjacent to a substitutional impurity.

12. The method according to claim 1, wherein focusing the laser into the crystal to induce creation, modification, dissociation, or diffusion of the one or more defects within the focal region of the laser further comprises:
focusing a first laser beam into the crystal to generate vacancy defects in the focal region, the first laser beam having a first energy wherein the energy of the laser beam is lower than the first energy.

13. The method according to claim 12, wherein the first laser beam provides a laser pulse of energy sufficient to generate vacancies within the crystal.

14. The method according to claim 12, wherein the laser beam provides sub-picosecond laser pulses.

15. The method according to claim 1, wherein the laser has an energy which is controlled to generate a non-linear response in rate of defect formation.

16. The method according to claim 1, wherein the laser generates at least one laser beam having a cross-sectional beam profile with a full-width-half maximum of no more than 10 micrometres, 1 micrometre, 500 nm, 400 nm, 350 nm, 200 nm, 250 nm, or 100 nm.

17. The method according to claim 1, wherein the laser is operated at a sufficiently high energy for the creation, modification, dissociation or diffusion of the one or more defects within the focal region of the laser during application of the laser and sufficiently low energy that the crystal is not graphitized.

18. The method according to claim 1, wherein the one or more defects within the focal region of the laser are located at a depth below a surface of the crystal that is at least one of (i) between 10 nm and 250 micrometres, (ii) between 50 nm and 250 micrometres, or (iii) between 3 micrometres and 60 micrometres.

19. The method according to claim 1, further comprising using the one or more characteristics of the crystal to determine the type or origin of the crystal.

20. The method according to claim 19, wherein the crystal is a diamond crystal and the signal is monitored to determine whether the diamond crystal is a natural diamond or a synthetic diamond.

21. The method according to claim 1, further comprising using the one or more characteristics of the crystal in a quality control method to determine that the crystal meets one or more end application requirements.

22. The method according to claim 1, wherein the one or more characteristics of the crystal are one or more of strain, chemical impurities, nuclear spin resonance properties, electron spin resonance properties, or isotopic content.

23. An apparatus for analysing a crystal, the apparatus comprising a laser system, a detector, and a processor configured to carry out operations including:
focusing a laser of the laser system into a crystal to induce creation, modification, dissociation, or diffusion of one or more defects within a focal region of the laser;
monitoring a signal dependent on the creation, modification, dissociation or diffusion of the one or more defects within the focal region of the laser during or after application of the laser, the signal being dependent on the crystal structure in which the one or more defects are disposed; and
determining one or more characteristics of the crystal being analysed based on the signal,
wherein focusing the laser into the crystal to induce creation, modification, dissociation, or diffusion of the one or more defects within the focal region of the laser comprises:
focusing a laser beam onto the focal region to induce diffusion of vacancy defects within the focal region, the laser beam providing a stream of laser pulses of energy sufficiently high to induce diffusion of vacancy defects within the focal region but sufficiently low as to not form new vacancy defects,
and wherein monitoring the signal comprises monitoring the signal during application of the laser beam to determine the one or more characteristics of the crystal being analysed based on the signal.

* * * * *